US012030544B2

(12) United States Patent
Marczak

(10) Patent No.: US 12,030,544 B2
(45) Date of Patent: Jul. 9, 2024

(54) SHIPPING TROLLEY FOR SELF-SERVICE SHOPPING

(71) Applicant: MAGO S.A., Nadarzyn (PL)

(72) Inventor: Piotr Marczak, Karczew (PL)

(73) Assignee: MAGO S.A., Nadarzyn (PL)

( * ) Notice: Subject to any disclaimer, the term of this patent is extended or adjusted under 35 U.S.C. 154(b) by 0 days.

(21) Appl. No.: 17/769,233

(22) PCT Filed: Oct. 15, 2020

(86) PCT No.: PCT/IB2020/059685
§ 371 (c)(1),
(2) Date: Apr. 14, 2022

(87) PCT Pub. No.: WO2021/074835
PCT Pub. Date: Apr. 22, 2021

(65) Prior Publication Data
US 2024/0132131 A1    Apr. 25, 2024

(30) Foreign Application Priority Data

Oct. 16, 2019   (PL) .......................................... 431493

(51) Int. Cl.
*B62B 3/14*   (2006.01)
*B62B 5/00*   (2006.01)
(Continued)

(52) U.S. Cl.
CPC .......... *B62B 5/0096* (2013.01); *B62B 3/1492* (2013.01); *G01G 19/4144* (2013.01); *B62B 2202/26* (2013.01); *B62B 2501/00* (2013.01)

(58) Field of Classification Search
CPC ....... B62B 5/0096; B62B 5/06; B62B 3/1292; B62B 3/14; B62B 3/1464; B62B 3/1472;
(Continued)

(56) References Cited

U.S. PATENT DOCUMENTS 10,845,235 B2 * 11/2020 McNeally .......... G01G 19/4144
2010/0318440 A1    12/2010 Coveley
(Continued)

FOREIGN PATENT DOCUMENTS

| CA | 3095178 A1 * | 10/2019 | ............. B62B 3/106 |
| CN | 108725563 A * | 11/2018 | |
| FR | 2962012 A3 * | 1/2012 | ............. A45C 13/26 |

OTHER PUBLICATIONS

International Search Report for PCT/IN2020/059685 dated Feb. 22, 2021.
Written Opinion for PCT/IB2020/059685 dated Feb. 22, 2021.

*Primary Examiner* — John D Walters
(74) *Attorney, Agent, or Firm* — Ralph E. Jocke; WALKER & JOCKE

(57) ABSTRACT

A shopping trolley for self-service shopping, includes a frame (1) supported by wheels (51, 52) The frame includes longitudinal beams (2) which at an upper end portion are coupled to each other by a handrail (3) that extends transverse thereto. A suspension assembly (4) extends operatively intermediate of the wheels and the frame. A scale (7) that includes an upward facing weighing surface is operatively supported by the frame. The shopping trolley includes a removable shopping bag (9) with a bottom (91). A pair of releasable grips (8) are operable to secure the shopping bag in a position with its bottom (91) on the weighing surface of the scale. An electronic terminal (6) is in operative connection with the scale.

20 Claims, 3 Drawing Sheets

(51) Int. Cl.
*G01G 19/40* (2006.01)
*G01G 19/414* (2006.01)

(58) Field of Classification Search
CPC ............ B62B 2202/26; B62B 2501/00; G01G 19/4144; G01G 19/41; G01G 19/413; G01G 19/414
See application file for complete search history.

(56) References Cited

U.S. PATENT DOCUMENTS

2012/0296751 A1* 11/2012 Napper ................. G06Q 20/208
  705/23
2022/0198550 A1*  6/2022 Meidar .................. G06Q 20/20

* cited by examiner

SHIPPING TROLLEY FOR SELF-SERVICE SHOPPING

TECHNICAL FIELD

Exemplary arrangements provide a shopping trolley for self-service shopping. In particular, the trolley is intended for carrying out the shopping process without attendance of the shop staff, as well as with minimum contact with the goods being purchased and without a conventional cash checkout.

BACKGROUND

Solutions are known for manually driven shopping trolleys comprising a frame construction provided with a user handrail and a chassis with a set of road wheels. On the frame construction of the trolley a basket is seated into which the purchasing user puts goods taken from shop shelves or racks, then he/she transports them to a cash checkout station where he/she unloads them in order to complete a respective payment transaction, and then he/she packs them into a shopping bag and takes the bags out of the shop area.

For small or medium shopping activity, customers often choose trolleys in which the frame construction has a holder for a shopping basket, the latter being often removable and positioned within the frame construction rack exclusively for the time of carrying out the shopping process. Such a solution is known, e.g. from FR 2658146 A which discloses a foldable frame with road wheels, comprising two sets of wheel struts, and horizontal bars on which containers for goods are hung.

Similarly, U.S. Pat. No. 5,865,449 discloses a construction frame of a shopping trolley with a pair of inclined longitudinal beams coupled with a transverse user handrail and a chassis seated on a front and rear road wheels assembly. In this case the trolley is provided with two fixed shopping baskets that are rotatably suspended on brackets secured in the frame longitudinal beams.

In view of the continuous development and improvement of shopping systems, as well as increasing demand for and interest of the clients in solutions based on self-service processes, conventional shopping trolley constructions have been provided with various functional assemblies built therein. For example, such assemblies enable autonomous scanning, recognition and weighing goods, carrying out payment transactions, as well as identification of a shopping client and tracking his/her presence within the shopping area, or finally pairing the shop system with the client's personal device of a smartphone type, as well as interaction with mobile applications accessible thereon that allow for assisting in the shopping process or for participation in promotion campaigns or loyalty programs. The aim in common of the solutions of this kind is to provide communication with clients and support in the shopping process as well as the highest possible extent of autonomous contact with the goods being purchased.

Solutions that show some of the above indicated functionalities are known from US 2015206121 A1, U.S. Pat. No. 7,679,522 B2 or WO 18036075 A1. For example, WO 18036075 A1 discloses a shopping trolley in which the trolley body comprises a capacious basket for storing goods and, on a handrail, an intelligent terminal device provided with a computer with a touchpad with a function for entering data concerning products and displaying contents for the user. The trolley is provided with radio frequency identification (RFID) tags for collecting information concerning the trolley serial number to enable its identification in the system. Additionally, the trolley may have one or more modules such as, for example, a trolley weight sensor or a certified scale for goods built in the shopping basket, product barcode scanning device, and a positioning device of a calculation-checkout module for self-service transaction operations.

In the above discussed solutions, in particular with regard to an intelligent shopping trolley, constructions are indicated where conventional, capacious and space-requiring shopping baskets alone or in sets are used. Due to the required stability and presence of functional modules, such trolleys do not provide the client with the ability to place selected goods in shopping bags that can be taken away by the client from the shopping area.

Thus, the prior systems may benefit from improvements.

SUMMARY

Exemplary arrangements provide a shopping trolley with systemic solutions such as recognition or weighting goods being purchased, and enable the construction to be used with one or more shopping bags that can be directly taken by the client when leaving the shopping area. Exemplary arrangements greatly simplify shopping processes and contribute to keeping the contact with the goods to a minimum, i.e. exclusively to placing the selected products into the shopping bag.

Exemplary arrangements provide a shopping trolley for self-service shopping. The trolley enables the client to place products in a trolley attached bag that, when the shopping process is completed, may be taken home by the client. In particular, the exemplary arrangements are intended to provide only limited contact with goods as well as systemic functionalities such as autonomous scanning, recognition and weighting products. Additional advantageous features may include enabling interaction with the shop computer system, including for example pairing with personalized settings of the user's mobile device applications or identifying the trolley operation within the respective shopping area.

A shopping trolley for self-service shopping according to an exemplary arrangement comprises a frame construction with wheels. The exemplary frame construction comprises longitudinal beams that are coupled with each other at the upper end portions by means of a handrail that extends transverse thereto. At the bottom the beams are each provided with wheels that are operatively connected with the beams through a suspension assembly. The frame construction is provided with an electronic control device functionally connected thereto and with at least one scale. The exemplary electronic control device is supported on the handrail and the scale is positioned above the wheels and suspension assembly. The exemplary shopping trolley includes a removable shopping bag with a bottom, and the scale arrangement is provided with shopping bag securing grips, and the shopping bag is seated with its bottom on the surface of the scale.

In an exemplary arrangement, the weight sensing surface of the scale extends between the longitudinal beams and a trolley front-facing front portion protrudes beyond the edges of the longitudinal beams of the frame.

Also in exemplary arrangements, the shopping bag securing grips are comprised of bars. At the upper part the bars are shaped into bag engaging closed loops. Below the loops the bars extend in parallel along the inner surfaces of the longitudinal beams and are secured in the surface of the scale.

Also in exemplary arrangements, the scale is provided with a protective rail to guard its front part.

Further in exemplary arrangements, the scale has a scale display which is positioned in the rear part of the scale.

According to another exemplary arrangement the longitudinal beams are each tilted rearward at the upper end portion compared to the lower end portion.

In exemplary arrangements, the wheels suspension assembly comprises two sets of longitudinal frames connected to the wheels and secured at the bottom edge of the longitudinal beams of the frame construction. In the exemplary arrangement each set of longitudinal frames comprises a forward extending frame and a rearward extending frame, both extending angularly downward and in mutually opposing directions.

In the exemplary arrangements, a respective forward extending frame and the rearward extending frame of a frame set are fixed at one point vertically on the lower end portion, and the forward extending frame is secured at the inner side, while the rearward extending frame is secured at the outer side, of a respective longitudinal beam of the frame.

Further in exemplary arrangements, the electronic control device is provided with circuitry including a computer processor, and at least one of a user display, speakers, a barcode scanner and wireless communication circuitry.

Also in exemplary arrangements, the trolley has at least one battery and electric charging circuitry.

In the exemplary arrangements, the electric charging circuitry includes induction charging circuitry.

Additionally, the exemplary trolley is provided with LED illumination or other lights, positioned along with the edges of the frame construction.

A trolley of the exemplary arrangements is constructed to be independent from conventionally used shopping baskets or other conventional arrangements. At the same time, functional communication between the electronic control device and the at least one scale makes it possible for a client using the exemplary trolley to minimize contact with the goods placed within the shopping bag and enables autonomous shopping activity.

DETAILED DESCRIPTION

Figure 1:
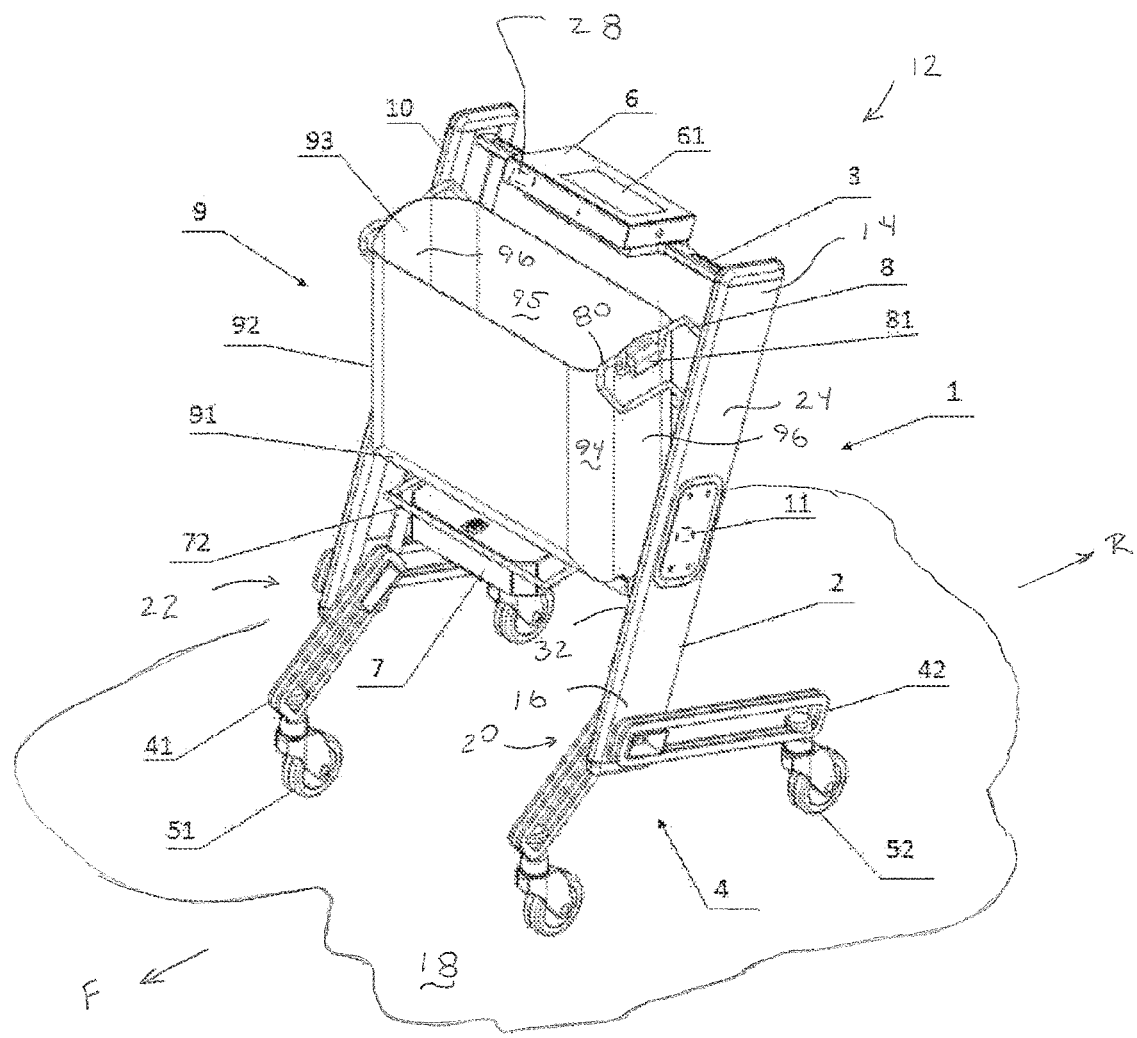
FIG. 1 is a front top right perspective view of an exemplary arrangement of a shopping trolley for self-service shopping.

Referring now to the drawings and particularly to FIG. 1 there is shown therein a shopping trolley generally indicated 12. A shopping trolley may alternatively be referred to herein as a shopping cart. The shopping trolley is made based on a frame construction 1 which is alternatively referred to as a frame. The frame includes two parallel vertically extending, horizontally disposed and rearward tilted longitudinal beams 2. Each longitudinal beam includes an upper end portion 14 and a lower end portion 16. The longitudinal beams 2 are coupled at the upper end portions by a handrail 3 that extends transverse thereto, said handrail being configured to be grasped by the user and pushed in order to move the trolley when carrying out shopping activity within a shopping area. At their lower end portions 16 the longitudinal beams 2 are in operative connection with a wheel suspension assembly 4. The suspension assembly 4 which is alternatively referred to herein as a wheel suspension, extends operatively intermediate of the wheels 51, 52 which are engaged with a floor 18 of the shopping area, and the frame 1. The exemplary wheel suspension includes a pair of frame sets 20, 22, each of which frame sets is in operatively attached connection with a respective lower end portion 16 of a respective longitudinal beam 2. Each of the frame sets 20, 22 comprises a pair of elongated frames 41, 42. Each elongated frame 41 of a respective frame set comprises a forward extending frame that extends in a forward direction indicated by Arrow F, from the respective lower end portion of the respective longitudinal beam to which the forward extending frame is operatively attached. In the exemplary arrangement the forward extending frames 41 of the frame sets 20, 22 extend in parallel relation. Further in the exemplary arrangement the forward extending frames 41 extend angularly downward from the respective lower end portion of the respective longitudinal beam to which the respective forward extending frame is in attached connection. Further as shown, each longitudinal beam includes a respective beam outer surface 24 and a beam inner surface 26. Each respective beam inner surface 26 of a longitudinal beam is in facing relation with the beam inner surface of the other longitudinal beam. As shown in the Figures each of the forward extending frames 41 is in operative attached connection with the respective beam inner surface 26 of a respective lower end portion 16 of a respective longitudinal beam.

The rearward extending frames 42 of each of the frame sets 20, 22 extends from the respective lower end portion 16 of the respective longitudinal beam to which the frame set is in operatively attached connection. In the exemplary arrangement the rearward extending frames 42 extend in a rearward direction indicated by Arrow R which is opposed of the forward direction. The rearward extending frames 42 extend parallel to one another. The exemplary rearward extending frames 42 are also in operatively attached connection with the beam outer surface of the respective longitudinal beam. As a result in the exemplary arrangement the forward extending frame and the rearward extending frame of each frame set are in operatively attached connection with opposed side surfaces of the respective lower end portion of the respective longitudinal beam. In the exemplary arrangement the rearward extending frames 42 extend angularly downward from the respective operatively attached lower end portion 16 of the respective longitudinal beam. As shown, the forward extending frame 41 and rearward extending frame 42 of each respective frame set are tilted and extending in opposite directions relative each other.

In the exemplary arrangement, the forward extending frame 41 of each frame set is in attached operative connection with at least one rotatable forward wheel 51. The forward wheel 51 is disposed in the forward direction from the respective longitudinal beam lower end portion 16 to which the frame set is operatively attached. The rearward extending frame 42 of each frame set is in operatively attached connection with at least one rotatable rear wheel 52 that is disposed in the rearward direction from the respective lower end portion of the respective longitudinal beam to which the frame set is operatively attached. In the exemplary arrangement each of the front wheels 51 is disposed a common distance in the forward direction from the lower end portions of the beams, and each of the rear wheels 52 is disposed a common distance in the rearward direction from the lower end portions of the beams. According to the arrangement shown, the frames 41, 42 of each frame set are secured to the respective longitudinal beam 2 at one common point, and the forward extending frame 41 with the front wheel is secured at the respective beam inner surface, while the rearward extending frame 42 with the rear road wheel 52 is secured at the respective beam outer surface of the respective longitudinal beam 2.

To the handrail 3, an electronic control device 6 which is alternatively referred to as an electronic terminal is attached. The electronic terminal includes circuitry 28 which includes a computer processor. The electronic terminal 6 constitutes the main module for communication with the client user while controlling operation of the other accessible functional modules in the course of the self-service shopping activity. According to an exemplary arrangement, electronic terminal 6 includes a panel that faces the user and has a display 61. The exemplary terminal may include circuitry and a bar code reader 62, and wireless communication circuitry 63. It should be emphasized that exemplary arrangements may include components that provide other functionalities that are not illustrated herein in the electronic terminal 6. These may be for example at least one speaker 64, built-in position sensors and processor executable software program instructions for self-service payment transactions (not shown in the drawing).

Above the wheels and suspension assembly 4 the frame 1 is in operative supporting connection with at least one scale 7. The at least one scale is in operative functional, wire or wireless communication with the circuitry 28 of the electronic terminal 6 and enables weighing goods being purchased. An operational area of the at least one scale 7 includes at least one upward facing weighing surface 30. In the exemplary arrangement the scale 7 is operative to determine a weight of at least one item that is in operatively engaged connection with the weighing surface 30. The exemplary weighing surface 30 extends transversely intermediate of longitudinal beams 2. In the exemplary arrangement each of the longitudinal beams 2 includes a front edge 32. The front edge extends intermediate of the respective upper end portion 14 and the lower end portion 16 of the respective longitudinal beam 2. Each front edge 32 faces in the forward direction. In the exemplary arrangement the generally upward facing weighing surface 30 of the scale has a front portion 71 that extends forward of the front edges 32. The front position 71 portion is guarded by a protective rail 72. Scale 7, in the exemplary arrangement additionally has a scale visual display 73, positioned at its rear part and extending in the rearward direction so that the scale display is visible for the user who drives the shopping trolley.

Figure 2:
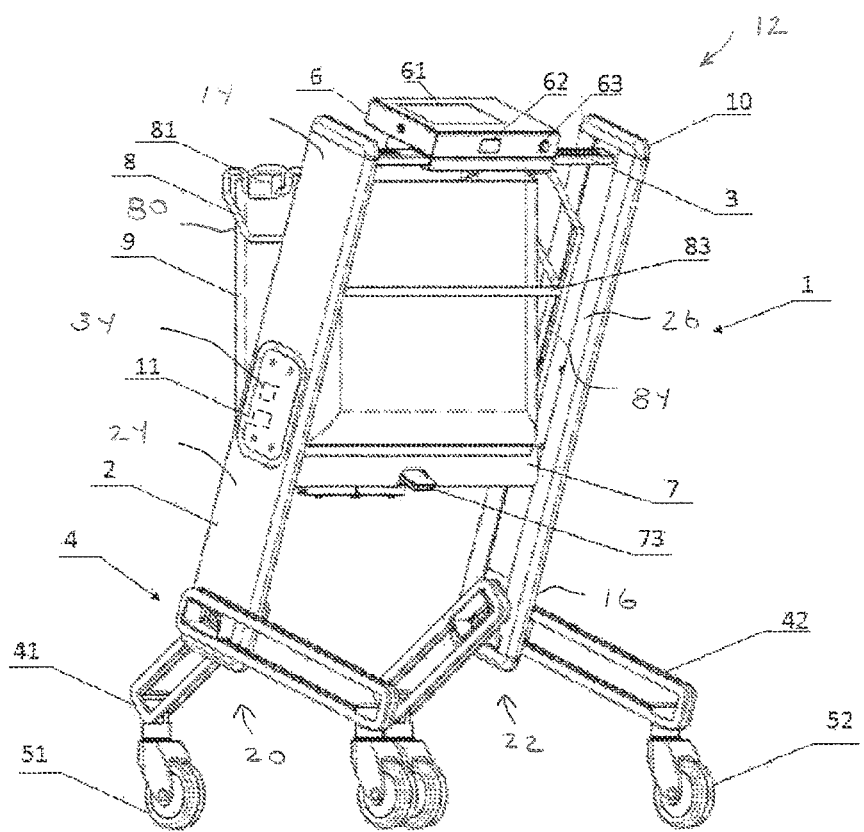
FIG. 2 is a back top right perspective view of the exemplary shopping trolley.
Figure 3:
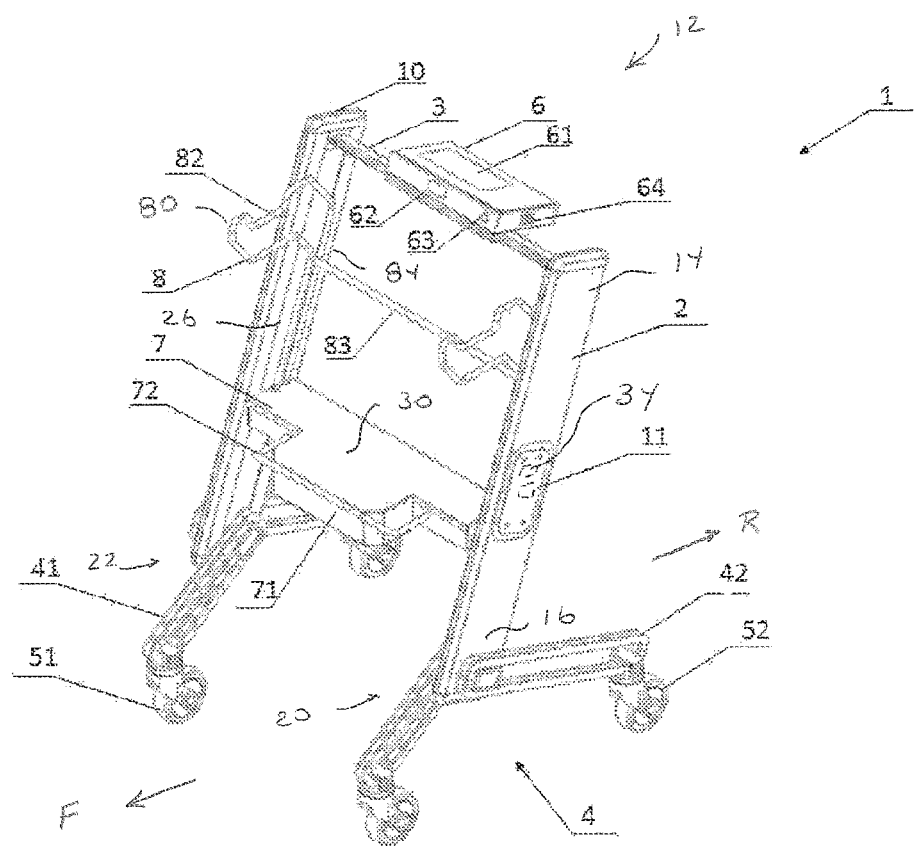
FIG. 3 is a front top right perspective view of the exemplary shopping trolley without the shopping bag in the operative position.

A pair of transversely disposed engageable bag grips 8 are used for securing a shopping bag 9 in operative connection with the frame of the trolley. In the exemplary arrangement the bag grips are horizontally disposed from one another as shown and are in operative connection with the frame. Each bag grip is configured to releasably engage a portion of at least one vertically extending wall 94 that bounds an interior area 95 of the shopping bag 9. In the exemplary arrangement each bag grip 8 is releasably engageable with a respective vertically extending bag side wall 96. In the exemplary arrangement each bag side wall 96 extends on an opposed transverse side of the shopping bag from the other bag side wall. According to the exemplary arrangement shown in FIG. 3 each bag grip 8 is comprised of at least one bar which at an upper end is shaped into a closed bag engagement loop 80. Each at least one bar includes a bar vertical portion 84 that extends below the bag engagement loop 80 and in parallel along the inner surface of the longitudinal beam immediately adjacent thereto. In the exemplary arrangement the bar vertical portions 84 extend into engagement with the at least one scale 7. The loops of the grips 8 may comprise additional fixing means, as illustrated in FIGS. 1 and 2, such as a fixing catch 81 and a shaped concavity 82, which is particularly clearly visible in the exemplary arrangement shown in FIG. 3. Furthermore, in order to strengthen and provide sufficient durability and carrying strength for the bag grips 8, when loaded with a shopping bag 9 suspended therefrom, bars of the bag grips 8, in the portion below the bag engagement loops 80, are strengthened by means of a crossbar 83 that connects them to each other.

In the use of the shopping trolley 12 according to the exemplary arrangement the bag grips 8 are releasibly engaged with a removable reusable shopping bag 9 from which bag grips the bag 9 is suspended. After the bag is loaded with items and upon termination of the shopping process within a shopping area, the bag 9 is taken home by the purchaser, without any need for repacking of the purchased items. The exemplary shopping bag 9 has a bottom wall 91 which bounds the lower end of the bag interior area 95. The at least one vertically extending wall also serves as a carrying surface 92 and terminates in an upper opening 93 through which the interior area 95 is accessible. According to the exemplary arrangement in FIGS. 1 and 2, the shopping bag 9 which in engaged relation with and suspended from the bag grips 8, extends forward of the longitudinal beams and the handrail and is seated with its bottom wall 91 on the surface 30 of the scale 7. Thus the at least one weighing surface of scale 7 is in operative engagement with the product item or items to be weighed when placed within the interior area 95 of the shopping bag 9.

Initial recognition and intended purchase of a product item to be weighed is effected at the electronic terminal 6. For example in the exemplary arrangement a product item may be identified by means of a product barcode read by the barcode reader 62 or by inputting through another input device some other suitable product identifier. When the kind of the product item to be weighed has been identified, the scale 7 checks its position and status, is balanced and is prepared for weighing based on the data obtained from the contact with the bottom wall 91 of the shopping bag 9 seated on the weighing surface 30. In the exemplary arrangement a signal of readiness for purchasing the selected product item is generated. The selected product item is positioned within the interior area 95 through the upper opening 93 of the shopping bag 9 and once released into the interior area it is automatically weighed. The value of the product item is calculated by the computer circuitry 28 and added to the shopping list of product items being purchased.

Apart from what is described above, a shopping trolley according to the exemplary arrangement has operational state signalling LED illumination battens 10 or other light emitters, positioned along at least one of the edges of the longitudinal beams 2 of the frame 1. Additionally, in order to ensure electric charging, it has dedicated connectors that according to the arrangement shown includes induction charging circuitry 11 positioned on the longitudinal beams 2 suitable for charging at least one battery 34 or other rechargeable power source.

Thus the exemplary arrangements that have been described herein achieve improved operation, eliminate difficulties encountered in the use of prior devices and systems, and attain the useful results described herein.

In the foregoing description, certain terms have been used for brevity, clarity and understanding. However no unnecessary limitations are to be implied therefrom because such terms are used for descriptive purposes and are intended to be broadly construed. Moreover the descriptions and illustrations herein are by way of examples and the new and useful features and relationships are not limited to the exact features and relationships that have been shown and described.

Having described features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

The invention claimed is:

1. A shopping trolley for self-service shopping, comprising:
 a frame, wherein the frame includes
  a pair of horizontally disposed vertically extending longitudinal beams,
   wherein each longitudinal beam includes an upper end portion and a lower end portion,
  a handrail configured for manual engagement, wherein the handrail
   is in fixed operative connection with the upper end portion of each longitudinal beam, and
   extends transversely between the upper end portions of the longitudinal beams,
  a plurality of rotatable floor engaging wheels,
   wherein at least one wheel is in operative supporting connection with the respective lower end portion of each respective longitudinal beam, whereby the lower end is maintained above the floor,
 at least one scale, wherein each at least one scale
  is in operative supported connection with the frame,
  includes an upward facing weighing surface, wherein the weighing surface extends horizontally intermediate of the longitudinal beams,
 an electronic terminal, wherein the electronic terminal
  includes circuitry, and
  is in operative connection with the at least one scale,
 a removable shopping bag, wherein the shopping bag includes
  an upper opening to a bag interior area,
   wherein the upper opening is bounded by a pair of transversely disposed, vertically extending bag side walls,
  a bag bottom wall, wherein the bag bottom wall bounds the lower end of the bag interior area,
  a pair of transversely disposed bag grips, wherein each bag grip
   is in operative connection with the frame,
   is releasably operatively engageable with a respective bag side wall,
  wherein in an operative position of the shopping bag the bottom wall is in operative supported connection with the weighing surface of the at least one scale, whereby a weight of at least one item within the bag interior area is enabled to be determined.

2. The shopping trolley according to claim 1
 wherein each longitudinal beam includes a respective front edge, wherein the front edge extends vertically intermediate of the upper end portion and the lower end portion of the respective longitudinal beam,
 wherein in the operative position the shopping bag extends transversely intermediate of the longitudinal beams and in a forward direction from each front edge,
 wherein the at least one upward facing weighing surface of the at least one scale extends in the forward direction from each front edge.

3. The shopping trolley according to claim 1
 wherein each longitudinal beam includes an inner surface,
  wherein each respective inner surface of a respective longitudinal beam extends in facing relation of the respective inner surface of the other longitudinal beam,
 wherein each respective grip includes at least one bar,
  wherein the at least one bar includes a bag engagement loop at a bar upper end, and
  a bar vertical portion, wherein the bar vertical portion extends between the respective bag engagement loop, vertically along an immediately adjacent longitudinal beam inner surface, and into engagement with the at least one scale.

4. The shopping trolley according to claim 1
 wherein each longitudinal beam includes a respective front edge, wherein the front edge extends vertically intermediate of the upper end portion and the lower end portion of the respective longitudinal beam,
 wherein in the operative position the shopping bag extends transversely intermediate of the longitudinal beams and in a forward direction from each front edge,
 wherein the at least one upward facing weighing surface of the at least one scale extends in the forward direction from each front edge,
and further comprising:
 a protective rail, wherein the protective rail extends in the forward direction ahead of the at least one upward facing weighing surface.

5. The shopping trolley according to claim 1
 wherein each longitudinal beam includes a respective front edge, wherein the front edge extends vertically intermediate of the upper end portion and the lower end portion of the respective longitudinal beam,
 wherein in the operative position the shopping bag extends transversely intermediate of the longitudinal beams and in a forward direction from each front edge,
 wherein the at least one upward facing weighing surface of the at least one scale extends in the forward direction from each front edge,
 wherein the at least once scale includes a visual display,
 wherein the display extends from the at least one scale in a rearward direction opposed of the forward direction.

6. The shopping trolley according to claim 1
 wherein each longitudinal beam includes a respective front edge, wherein the front edge extends vertically intermediate of the upper end portion and the lower end portion of the respective longitudinal beam,
 wherein in the operative position the shopping bag extends transversely intermediate of the longitudinal beams and in a forward direction from each front edge,
 wherein each longitudinal beam is tilted in a rearward direction between the lower end portion and the upper end portion, wherein the rearward direction is opposed of the forward direction.

7. The shopping trolley according to claim 1
and further comprising:
 a wheel suspension, wherein the wheel suspension extends operatively intermediate of the plurality of wheels and the frame, wherein the wheel suspension includes
a pair of frame sets, wherein each respective frame set is in operative attached connection with a respective lower end portion of a respective longitudinal beam,
wherein each respective frame set includes
a forward extending frame, wherein the forward extending frame extends in a forward direction from the respective operatively attached the lower end portion of the respective longitudinal beam, and
a rearward extending frame, wherein the rearward extending frame extends in a rearward direction from the respective operatively attached lower end portion of the respective longitudinal beam, wherein the rearward direction is opposed of the forward direction,
wherein the forward extending frames of the frame sets extend in parallel relation, and the rearward extending frames of the frame sets extend in parallel relation,
wherein at least one wheel is in operative connection with each forward extending frame and is disposed in the forward direction of the respective operatively attached lower end portion of the respective longitudinal beam, and at least one wheel is in operative connection with each rearward extending frame and is disposed in the rearward direction of the respective operatively attached lower end portion of the respective longitudinal beam.

8. The shopping trolley according to claim 1 and further comprising:
a wheel suspension, wherein the wheel suspension extends operatively intermediate of the plurality of wheels and the frame,
wherein the wheel suspension includes
a pair of frame sets, wherein each respective frame set is in operative attached connection with a respective lower end portion of a respective longitudinal beam,
wherein each respective frame set includes
a forward extending frame, wherein the forward extending frame extends in a forward direction from the respective operatively attached lower end portion of the respective longitudinal beam, and
a rearward extending frame, wherein the rearward extending frame extends in a rearward direction from the respective operatively attached lower end portion of the respective longitudinal beam, wherein the rearward direction is opposed of the forward direction,
wherein the forward extending frames of the frame sets extend in parallel relation, and the rearward extending frames of the frame sets extend in parallel relation,
wherein at least one of the forward extending frame and the rearward extending frame in each frame set extend angularly downward from the respective operatively attached lower end portion of the respective longitudinal beam,
wherein at least one wheel is in operative connection with each forward extending frame and is disposed in the forward direction of the respective operatively attached lower end portion of the respective longitudinal beam, and at least one wheel is in operative connection with each rearward extending frame and is disposed in the rearward direction of the respective operatively attached lower end portion of the respective longitudinal beam.

9. The shopping trolley according to claim 1 and further comprising:
a wheel suspension, wherein the wheel suspension extends operatively intermediate of the plurality of wheels and the frame,
wherein the wheel suspension includes
a pair of frame sets, wherein each respective frame set is in operative attached connection with a respective lower end portion of respective longitudinal beam,
wherein each respective frame set includes
a forward extending frame, wherein the forward extending frame extends in a forward direction from the respective operatively attached the lower end portion of the respective longitudinal beam, and
a rearward extending frame, wherein the rearward extending frame extends in a rearward direction from the respective operatively attached lower end portion of the respective longitudinal beam, wherein the rearward direction is opposed of the forward direction,
wherein the forward extending frames of the frame sets extend in parallel relation, and the rearward extending frames of the frame sets extend in parallel relation,
wherein the forward extending frame of each respective frame set is operatively attached to the respective operatively attached lower end of the respective longitudinal beam, on an opposed transverse side of the respective longitudinal beam from a transverse side on which the rearward extending frame of the respective frame set is operatively attached,
wherein at least one wheel is in operative connection with each forward extending frame and is disposed in the forward direction of the respective operatively attached lower end portion of the respective longitudinal beam, and at least one wheel is in operative connection with each rearward extending frame and is disposed in the rearward direction of the respective operatively attached lower end portion of the respective longitudinal beam.

10. The shopping trolley according to claim 1 and further comprising:
a wheel suspension, wherein the wheel suspension extends operatively intermediate of the plurality of wheels and the frame,
wherein the wheel suspension includes
a pair of frame sets, wherein each respective frame set is in operative attached connection with a respective lower end portion of a respective longitudinal beam,
wherein each respective frame set includes
a forward extending frame, wherein the forward extending frame extends in a forward direction from the respective operatively attached lower end portion of the respective longitudinal beam, and
a rearward extending frame, wherein the rearward extending frame extends in a rearward direction from the respective operatively attached lower end portion of the respective longitudinal beam, wherein the rearward direction is opposed of the forward direction,
wherein the forward extending frames of the frame sets extend in parallel relation, and the rearward extending frames of the frame sets extend in parallel relation,
wherein the forward extending frame and the rearward extending frame of each frame set are operatively attached to the respective lower end of the respective longitudinal beam at a common vertical location, and on opposed transverse sides of the respective longitudinal beam, wherein at least one wheel is in operative connection with each forward extending frame and is disposed in the forward direction of the respective operatively attached lower end portion of the respective longitudinal beam, and at least one wheel is in operative connection with each rearward extending frame and is disposed in the rearward direction of the respective operatively attached lower end portion of the respective longitudinal beam.

11. The shopping trolley according to claim 1
wherein the electronic terminal includes at least one of a display, a loudspeaker, a barcode reader and wireless communication circuitry.

12. The shopping trolley according to claim 1
wherein the electronic terminal is in attached connection with the handrail.

13. The shopping trolley according to claim 1
and further comprising:
at least one battery,
at least one charging circuit, wherein the at least one charging circuit is operative to charge the at least one battery.

14. The shopping trolley according to claim 1
and further comprising:
at least one battery,
at least one charging circuit, wherein the at least one charging circuit is operative to charge the at least one battery,
wherein the at least one charging circuit includes an inductive charging circuit.

15. The shopping trolley according to claim 1
wherein each longitudinal beam is bounded by at least one edge,
wherein a light emitter extends along the at least one edge.

16. A shopping trolley for self-service shopping, comprising:
a frame, wherein the frame includes
a pair of horizontally disposed vertically extending longitudinal beams,
wherein each longitudinal beam includes an upper end portion and a lower end portion,
a handrail configured for manual engagement, wherein the handrail
is in fixed operative connection with the upper end portion of each longitudinal beam, and extends transversely between the upper end portions of the longitudinal beams,
a plurality of rotatable floor engaging wheels,
wherein at least one wheel is in operative supporting connection with the respective lower end portion of each respective longitudinal beam, whereby the lower end of the respective longitudinal beam is maintained above the floor,
at least one scale, wherein the at least one scale
is in operative supported connection with the frame,
includes an upward facing weighing surface, wherein the weighing surface extends horizontally intermediate of the longitudinal beams,
an electronic terminal, wherein the electronic terminal includes electronic circuitry, and
is in operative connection with the at least one scale,
a pair of transversely disposed shopping bag grips, wherein each shopping bag grip
is in operative connection with the frame,
is configured to releasably engage a respective shopping bag wall portion that bounds an interior area of a shopping bag,
wherein the pair of shopping bags grips are configured to releasably hold opposed shopping bag wall portions that bound an upper opening to the interior area of the shopping bag while the at least one weighing surface is in engagement with a bottom wall of the shopping bag that bounds the interior area of the shopping bag,
wherein with each of the shopping bag grips in engagement with the shopping bag the at least one scale is enabled to determine a weight of at least one item within the interior area of the shopping bag.

17. The shopping trolley according to claim 16
and further comprising the shopping bag.

18. The shopping trolley according to claim 17
wherein each respective shopping bag grip includes at least one bar,
wherein the at least one bar includes a bag engagement loop at an upper end, and a bar vertical portion, wherein the bar vertical portion extends intermediate of the bag engagement loop and the at least one scale.

19. The shopping trolley according to claim 17
wherein the opening of the shopping bag and the at least one weighing surface extend in a forward direction from the handrail.

20. A shopping trolley for self-service shopping, comprising:
a frame, wherein the frame includes a pair of transversely disposed, vertically extending, longitudinal beams,
a handrail configured for manual engagement and in operative connection with each of the longitudinal beams,
a plurality of wheels in operative supporting connection with the frame,
a scale, wherein the scale is in operative connection with the frame and includes an upward facing weighing surface extending transversely intermediate of the longitudinal beams,
an electronic terminal including circuitry, wherein the circuitry is in operative connection with the scale,
a shopping bag, wherein the shopping bag
is releasably operatively engageable with the frame,
includes an interior area bounded by at least one vertically extending sidewall and a horizontally extending bottom wall,
a pair of transversely disposed bag engaging grips, wherein each bag engaging grip
is in operative connection with the frame, and
is configured to releasably engage a sidewall portion of the at least one side wall of the shopping bag,
wherein the bottom wall of the shopping bag is in engagement with the upward facing weighing surface of the scale and a weight of at least one item within the interior area of the shopping bag can be determined through operation of the scale.

\* \* \* \* \*